United States Patent [19]

Wetzel

[11] Patent Number: 4,499,338

[45] Date of Patent: Feb. 12, 1985

[54] KEY TELEPHONE SYSTEM SIGNALLING AND CONTROL ARRANGEMENT

[75] Inventor: David L. Wetzel, Charlottesville, Va.

[73] Assignee: Northern Telecom, Ltd., Montreal, Canada

[21] Appl. No.: 487,295

[22] Filed: Apr. 21, 1983

[51] Int. Cl.³ .................. H04M 1/72; H04M 1/68
[52] U.S. Cl. .................. 179/99 E; 179/99 H; 179/99 M
[58] Field of Search .......... 179/99 M, 99 E, 99 H, 179/99 R, 18 J, 18 AD, 18 ES; 370/110.1

[56] References Cited

U.S. PATENT DOCUMENTS

| | | | |
|---|---|---|---|
| 3,549,820 | 12/1970 | Knollman | 179/99 |
| 3,647,980 | 3/1972 | Fabiano, Jr. et al. | 179/18 ES |
| 4,234,765 | 11/1980 | Sekiguchi et al. | 179/99 M |

Primary Examiner—Stafford D. Schreyer
Attorney, Agent, or Firm—Schwartz, Jeffery, Schwaab, Mack, Blumenthal & Koch

[57] ABSTRACT

A key telephone system having a plurality of telephone station sets for selective connection to a plurality of telephone lines. At least one set having circuitry for transmitting in a selected time slot on a control line, a signal requesting a hold state on the telephone line connected to the set. The system includes a control unit which upon detecting the signal requesting the hold state places a hold network on the telephone line and continues to transmit the signal in the selected time slot. Each of the telephone sets includes circuitry which is responsive to the signal in the selected time slot for indicating the hold status of the telephone line.

3 Claims, 3 Drawing Figures

KEY TELEPHONE SYSTEM SIGNALLING AND CONTROL ARRANGEMENT

CROSS-REFERENCE TO RELATED APPLICATIONS

The following commonly assigned patent application is related to this application:
Title: Key Telephone System Signalling and Control Arrangement
Inventor: David L. WETZEL and Mahesh SHAH
Ser. No. 487,299
Filed: 4-21-83

This invention relates to a key telephone system and more particularly one in which signalling and control are shared between a common control unit and a plurality of station sets over a common control line.

BACKGROUND OF THE INVENTION

Early key telephone systems utilized separate pairs of lines for both the voice and signalling paths thereby necessitating upwards of forty or more individual conductors for the operation of a 6-button key station set. Utilizing electronic control combined with an intermediate switching network has enabled this to be reduced to a single pair of wires for the voice path and one or two additional pairs for power and control signalling. U.S. Pat. No. 3,549,820 of Dieter J. H. Knollman, issued Dec. 22, 1970 and entitled, "Key Telephone Station Concentrator" discloses an early system of this type. U.S. Pat. No. 3,647,980, of Lucian P. Fabiano, Jr., et al, issued Mar. 7, 1972 and entitled, "Switching Network Control without Network Map" discloses an improved central processor controlled key telephone system. More recently, computer controlled switching systems provide many features of the early key telephone systems plus more advanced features such as conferencing, call transferring, speed calling, and call forwarding.

In small installations, there is a need for many of the features offered by these systems while retaining a directly connected central office powered service which would continue to operate should power to the locally controlled key telephone network fail.

STATEMENT OF THE INVENTION

The present invention provides one such feature together with a unique control arrangement for a key telephone system in which control is time shared between a central control unit and each of the telephone station sets over a common control line. This arrangement provides a unique "hold acknowledge" handshake function which reduces the possibility of losing a line due to a system malfunction when a call is placed on hold. Thus the present invention provides a key telephone system having a plurality of station telephone sets for selective connection to first or second telephone lines. The system includes a control unit having a common control line connected to each of the station sets. The unit includes circuitry for periodically transmitting a framing signal on the common control line. Circuitry is provided at one of the station sets when connected to one of the telephone lines for transmitting in a preselected time slot following the framing signal, a signal requesting a hold state on the said one telephone line. Circuitry is also provided at the common control unit which is responsive to the signal requesting a hold state, for connecting a hold network to the said one line and for concurrently transmitting a hold status signal in said preselected time slot. In addition, each of the station sets includes circuitry which is responsive to the signal in the preselected time slot from either the set or the unit for indicating a hold status on the telephone lines.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
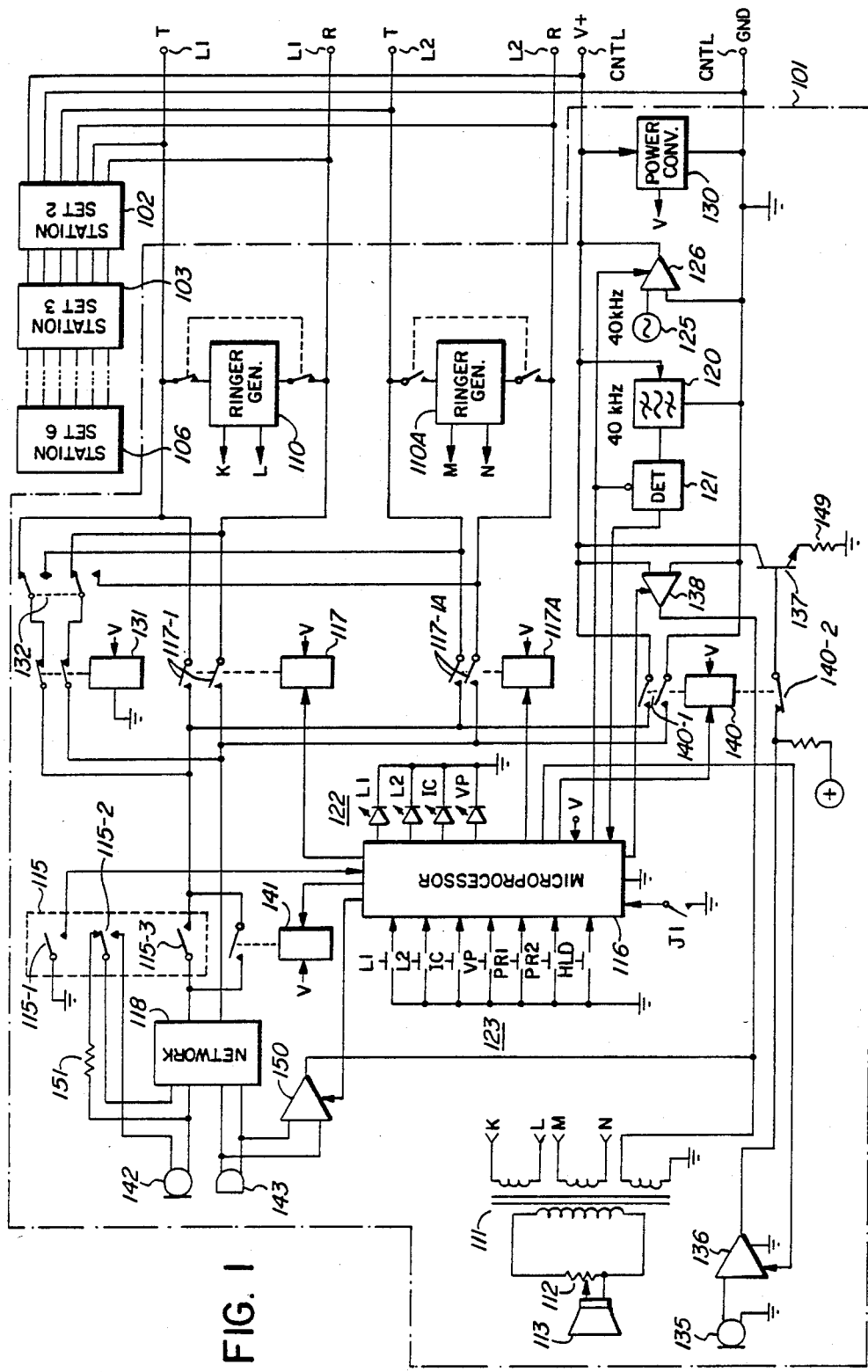
FIG. 1 is a block and schematic diagram of the telephone station sets which form part of a key telephone system in accordance with the present invention.
Figure 2:
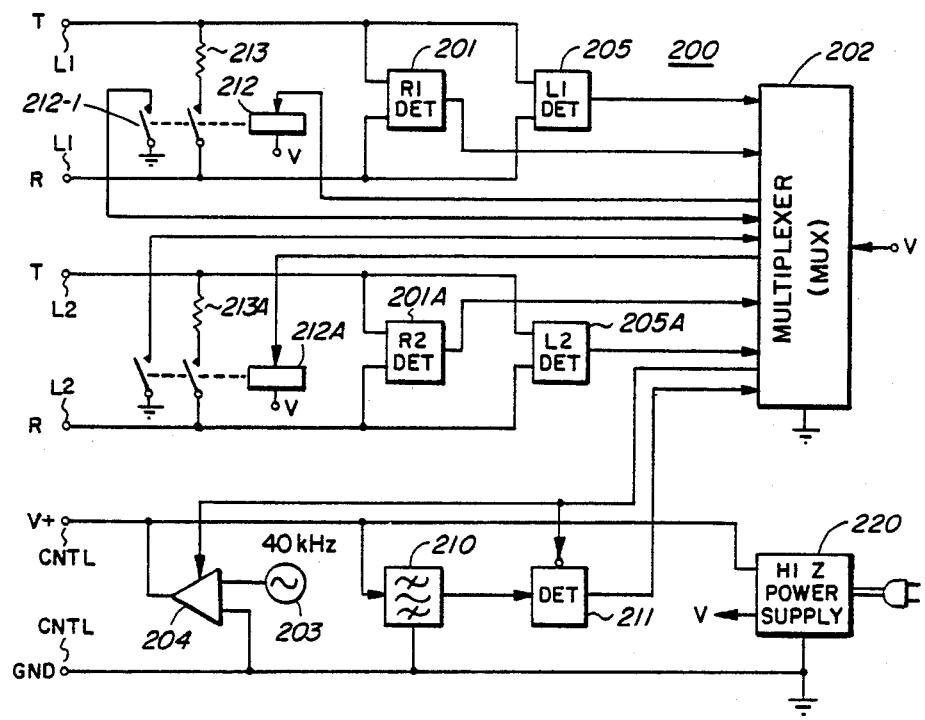
FIG. 2 is a block and schematic diagram of a control unit which forms the balance of the key telephone system illustrated in FIG. 1.

Referring to FIG. 1, the key telephone system comprises up to six telephone station sets 101, 102, 103, -106 which are connected in parallel to the Tip and Ring T,R of two central office lines L1 and L2. Since the station sets 101-106 are substantially identical to each other, only station set 101 is shown in detail. As shown in FIG. 2, the common control unit 200 which forms part of the system is also connected to both the central office lines L1 and L2. The detailed structure of the key telephone system will be manifest from the following description of its function and operation with particular reference to Line L1 which has been designated the primary line. Similar operation is available on line L2 and hence corresponding components connected to it will be identified by corresponding reference numbers followed by the letter "A".

Figure 3:
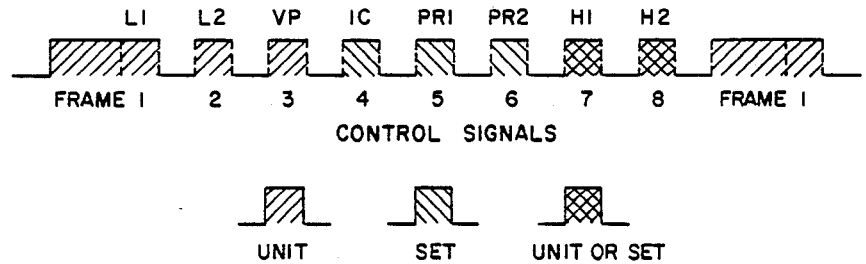
FIG. 3 illustrates typical control signals transmitted by the sets and unit illustrated in FIGS. 1 and 2.

Referring to both FIGS. 1 and 2, a multiplexer (MUX) 202 generates a continuous 3.906 ms pulse framing signal at a 35.156 ms repetition rate. Both framing and control signals (described below) gate the output of a 40 KHz generator 203 through analog gate 204 to generate 40 KHz signal bursts which are coupled to each of the station sets 101-106 on a control line CNTL. The interval between the framing signals is divided into eight 3.906 ms time slots in which the control signals can be selectively inserted. As shown in FIG. 3, the control signals coupled to the control line CNTL (also comprising 40 KHz signal bursts) may originate with the common control unit 200, any one of the telephone sets 101-106, or selectively, both. In order to distinguish between the framing signal and the balance of the control signals, the duty cycle of the latter is half that of the framing signal. The framing signal is used by microprocessors 116 in the telephone sets 101-106 to synchronize and control the timing for insertion and detection of the control signals in the preselected time slots. As mentioned above, line L1 has been designated the primary line. Line 2 can be selected as the primary line for any set through a control signal to the microprocessor 116. This is done by grounding a control input through jumper J1.

When ringing for an incoming call is received on the line L1, it is detected by a ringing detector 201 in the control unit 200, which in turn sends a signal to the multiplexer 202. Detection of the ringing signal on line L1 causes the multiplexer 202 to generate control signals L1 in the time slot 1 and H1 in time slot 7. Normally, the signal L1 is used to indicate an off-hook status on line L1 while H1 indicates a hold condition. However, the simultaneous presence of signals L1 and H1 in the absence of a privacy release signal PR1 in time slot 5, indicates a ringing condition on line L1.

The ringing generator 110, connected across line L1 in station set 101 responds to the ringing signal and generates ringing tones that are coupled through transformer 111, volume control 112 to speaker 113. Each of the station sets has its own independent ringing generators connected across the lines L1 and L2 in order to meet the requirement that the sets will continue to function should local power and control be lost. When for instance, the station set 101 goes off-hook, its telephone hook switch 115 connects a ground through contacts 115-1 to the microprocessor 116. The microprocessor 116 in turn actuates a relay 117 which through its contacts 117-1 connects the Tip and Ring T, R of line L1 to a standard telephone network 118 through hook-switch contacts 115-3.

This causes a d-c voltage drop on line L1, which triggers an off-hook line status detector 205 that in turn transmits a signal to the multiplexer 202. The multiplexer 202 stops generating signal H1, leaving only signal L1 in time slot 1 thus indicating an off-hook condition on line 1. Simultaneously, the central office (not shown) detects the off-hook condition and the ringing signal ceases.

During a ringing state, the status of line L1 and hold H1 signals in time slots 1 and 7 on the control line CNTL are coupled through a 40 KHz bandpass filter 120 to a detector 121 which is gated open by a control signal from the microprocessor 116 whenever the set 101 is not transmitting control signals to the line CNTL. The detected signals are coupled to the microprocessor 116, which in turn causes the line L1 lamp 122 to blink indicating a ringing state. When ringing ceases, the L1 lamp is lit in a steady state thus indicating an off-hook state.

Except at the station set which has initially gone off-hook, the presence of the off-hook line signal L1 provides line privacy under control of the microprocessor 116 which prevents access of any of the other sets to that line. However, this feature can be readily overridden by actuating the privacy release button PR1 of control buttons 123 which causes the microprocessor 116 to generate a privacy release signal PR1 in time slot 5. The presence of this signal PR1 allows one of the balance of the station sets access to the line L1 upon actuation of its line button L1 of control buttons 123, which causes the microprocessor 116 to actuate the control relay 117. This pulse signal PR1 gates the output of a 40 KHz signal generator 125 onto the line CNTL through analog gate 126 in time slot 5. Concurrently, the signal blocks the detector 121 so that the output signal from the gate 126 is not received by the microprocessor 116.

To place the line in a "hold" state, actuation of the hold button HLD of the control buttons 123 causes the microprocessor 116 to generate a hold signal H1 in time slot 7 for one frame. At the same time, microprocessor 116 commences to generate the privacy release signal PR1 in time slot 5. This is necessary to enable any other set to obtain access to the line. The initial hold signal H1 in time slot 7 is coupled through a filter 210 and a detector 211 in the control unit 200 to the multiplexer 202 which in turn actuates a relay 212 that places a hold resistor 213 across line L1. Actuation of the relay 212 also closes ground contacts 212-1 which causes the multiplexer 202 to generate the hold signals H1 in subsequent time slots. This hold-handshake arrangement enables any off-hook telephone set to initiate a "hold" state which results in the central control unit 200 connecting the hold resistor 213 across the line L1.

The simultaneous presence of all hold signals, i.e. the line status L1, the privacy release PR1 and the hold H1 signals in time slots 1, 5 and 7 causes the line indicating light L1 of lights 122 to blink at a 2 Hz rate. Since the privacy release signal PR1 is present, any one of the station sets 101–106 has access to the line L1. When any one set goes off-hook, it is placed in shunt with the hold circuit 213 thereby lowering the line voltage even further. This action is detected by line detector 205 which causes the multiplexer 202 to release the relay 212 thereby restoring the line to its normal off-hook state. In response to the cessation of the hold signal H1, the initiating set will also cease transmission of the privacy release signal PR1 in time slot 5 thereby limiting access to the single station set unless privacy release is actuated again by that set.

Local power to each of the station sets is supplied from a high impedance d-c power supply 220 in the control unit 200 which obtains its primary power from the mains. In each of the station sets, this d-c supply voltage is converted by a power converter 130 to provide an output voltage V which is used to drive the various elements. The power supply 220 also provides internal power for the various elements at the central unit 200. Should this power fail, a relay 131 at each station set will be released thereby connecting the set to one of the two lines L1 or L2 depending upon the position of switch 132. This provides basic telephone service to each of the sets during a local power failure.

To operate the key system in a voice paging mode, the voice paging button VP of control buttons 123 is actuated which generates control signals in the microprocessor 116 (providing the intercom is not being used by any of the station sets) that opens analog gate 136 which connects a voice paging microphone 135 to transistor amplifier 137, the output of which is connected across the control line CNTL. Concurrently, a voice paging signal VP is transmitted in time slot 3 to the balance of the station sets. At these sets, the detected VP signal causes the microprocessor 116 to open an analog gate 138, thus coupling the received voice signal through the transformer 111 and volume control 112 to the speaker 113. The VP signal also causes voice page lamps VP of lamps 122 to actuate in the balance of the sets. Concurrently, the microprocessor 116 actuates a voice paging lamp VP of indicating lamps 122 at the initiating set. Voice paging assists in alerting a call for another party, establishing an intercom connection, or providing group discussion.

For operation as an intercom, the intercom control button IC of buttons 123 is actuated thereby transmitting an intercom signal in time slot 4 (providing the voice paging is not being used by any of the other station sets). The intercom signal causes the intercom IC lamps of lamps 122 to actuate at the balance of the sets. Concurrently, relay 140 at the initiating set is actuated under control of the microprocessor 116 thereby connecting both its telephone handset microphone 142 and receiver 143 to the control line CNTL through the network 118 when the hook switch 115 is operated. Actuation of the control button IC at any of the other station sets 102–106 will result in a similar action so that the two telephone sets are connected together through the common control line CNTL thus establishing an intercom connection. Actuating the IC button will automatically disconnect that set from either of the lines L1 and L2.

Actuation of relay 140 closes contacts 140-1 to place the network 118 across the control line CNTL whenever the hook switch 115 is operated. The network loading on this line CNTL can cause a transient which may disrupt the 40 KHz signalling. To negate this, relay contacts 140-2 simultaneously open the base of transistor 137 which causes it to stop conducting, thereby removing emitter load resistor 149 from across the control line CNTL. The value of this resistor 149 is selected to compensate for the loading of the network 118 so that this transient is reduced to a negligible value.

To provide on-hook listening or dialing, the input to the receiver 143 is connected to a gate controlled amplifier 150 the output of which is connected through transformer 111, loudness control 112 to the speaker 113. Actuation of either line buttons L1 or L2 of buttons 123 will close relay 141 and close gate amplifier 150 under control of the microprocessor 116. Should the set go off-hook by actuation of the hook switch 115, the ground through contacts 115-1 will cause the microprocessor 116 to release relay 141 and open gate 150. To maintain a balance in the network 144, a resistor 151 is connected across the network 118 through contacts 115-2, in place of the transmitter 142 when the hook switch 115 is in an on-hook condition.

What is claimed is:

1. In a key telephone system having a plurality of station sets for selective connection to a plurality of telephone lines;
   a control unit having a common control line connected to each of said station sets;
   means for periodically transmitting a framing signal on said common control line from said unit;
   means at one of said station sets when connected to one of the telephone lines, for transmitting in a preselected time slot following said framing signal, a signal requesting a hold state on said one telephone line;
   means at said common control unit responsive to said signal requesting a hold state, for connecting a hold network to said one line, and for concurrently transmitting a hold status signal in said preselected time slot; and
   means responsive to said signal in said preselected time slot from either said one set or said unit for indicating at said station sets a hold status on said one telephone line.

2. In a key telephone system having a plurality of telephone station sets for selective connection to first or second telephone lines;
   a control unit comprising:
   means for periodically transmitting a framing signal on a common control line to each of the station sets, the period between each framing signal being divided into a selected number of time slots, and means responsive to a voltage drop on one of the first or second telephone lines, resulting from one of the telephone station sets being connected to that line in an off-hook state, for transmitting a first signal in a first one of the time slots, to signal the off-hook state;
   each telephone station set comprising means responsive to the first signal for indicating said off-hook state;
   said one telephone station set also comprising means for selectively transmitting a second signal in a second one of the time slots identifying privacy release of said one line together with an initial third signal in a third one of the time slots requesting a hold state on said one line;
   said control unit also comprising;
   means responsive to said third signal for connecting a hold network to said one line and for transmitting the third signal in the third one of the time slots in subsequent frames;
   means responsive to a further voltage drop on said one line resulting from one of the station sets being connected to that line in an off-hook state in shunt with the hold network, for releasing said hold network from said one line, and for ceasing transmission of said third signal; and
   each telephone station set also comprising means responsive to the concurrent transmission of the second and third signals for indicating said hold state on said one line.

3. A key telephone system as defined in claim 2 in which:
   said control unit additionally comprises means responsive to a ringing signal on said one line for transmitting the third signal; and
   each telephone station set comprises means responsive to the third signal in the absence of the second signal for indicating a ringing state.

* * * * *